US00RE36643E

United States Patent [19]

Olson et al.

[11] E Patent Number: Re. 36,643

[45] Reissued Date of Patent: Apr. 4, 2000

[54] BUOYED SENSOR ARRAY COMMUNICATIONS SYSTEM

[75] Inventors: Jack R. Olson; J. Mark Stevenson, both of San Diego, Calif.; Barbara J. Sotirin, Hanover, N.H.

[73] Assignee: The United States of America as represented by the Secretary of the Navy, Washington, D.C.

[21] Appl. No.: 09/067,697

[22] Filed: Apr. 28, 1998

Related U.S. Patent Documents

Reissue of:

[64] Patent No.: 5,663,927
Issued: Sep. 2, 1997
Appl. No.: 08/652,206
Filed: May 23, 1996

[51] Int. Cl.[7] ..... H04B 1/59; H04B 11/00

[52] U.S. Cl. ..... 367/4; 367/3; 367/76; 367/131; 367/153; 340/870.16

[58] Field of Search ..... 367/3, 4, 76, 78, 367/79, 129, 131, 153; 441/2, 33; 340/825.07, 825.08, 825.54, 870.07, 870.16

[56] References Cited

U.S. PATENT DOCUMENTS

| | | |
|---|---|---|
| H1371 | 11/1994 | Bucker et al. . |
| 3,081,466 | 3/1963 | Bailey . |
| 3,800,271 | 3/1974 | Stillman, Jr. . |
| 3,881,166 | 4/1975 | Fort et al. . |
| 3,982,222 | 9/1976 | Urick . |
| 4,056,801 | 11/1977 | Leisterer et al. . |
| 4,114,135 | 9/1978 | Funk . |
| 4,193,057 | 3/1980 | Bennett et al. . |
| 4,196,417 | 4/1980 | Fasching et al. . |
| 4,320,472 | 3/1982 | Fort . |
| 4,358,834 | 11/1982 | Swenson . |
| 4,631,709 | 12/1986 | Bender et al. . |
| 5,003,514 | 3/1991 | Cotilla et al. . |
| 5,007,029 | 4/1991 | Scott . |
| 5,224,074 | 6/1993 | Sullivan . |
| 5,272,476 | 12/1993 | McArthur et al. . |
| 5,283,767 | 2/1994 | McCoy . |

*Primary Examiner*—Ian J. Lobo
*Attorney, Agent, or Firm*—Harvey FEndelman; Peter A. Lipovsky; Michael A. Kagan

[57] ABSTRACT

A buoyed sensor array communications system comprises multiple sensor systems electrically connected to a signal transmission line which are positioned at predetermined locations along the signal transmission line to form a linear sensor array. Each of the sensor systems generates a data signal in response to receiving an address signal. The system further includes; a processor system electrically connected to the signal transmission line for transmitting address signals to enable any one of the sensor systems at a time in a selectively accessed order and has a data storage memory for storing the data signal from each of the sensor systems as stored data. A radio frequency transmitting system is coupled to the data processor and transmits the stored data at a predetermined time. A negatively buoyant structure connected to the signal transmission line pulls the communications system to the bottom of a body of water upon deployment. A positively buoyant structure supports the processor system and radio frequency transmitting system, and is connected to the signal transmission line. A signal transmission line cutting system mounted in the buoyant structure severs the signal transmission line upon receipt of a cutting system enablement signal generated by said processor system, whereupon the buoyant structure floats to the surface of said body of water. Then the transmitting system transmits the stored data.

32 Claims, 5 Drawing Sheets

BUOYED SENSOR ARRAY COMMUNICATIONS SYSTEM

Matter enclosed in heavy brackets [ ] appears in the original patent but forms no part of this reissue specification; matter printed in italics indicates the additions made by reissue.

BACKGROUND OF THE INVENTION

The invention relates to a sensor array communications system in which time division multiplexing is used to enable any one of multiple sensors in a selectively accessed access order.

Sensors for detecting physical characteristics of ocean environments tend to be expensive and complicated, and are typically incorporated into array systems which are heavy, bulky, and power hungry. Deployment and recovery of sensor array systems intended to be moored to the bottom of the ocean generally requires large expenditures of manpower and ship time. A continuing need exists for sensor array systems which are easy to deploy and recover, as well as inexpensive to manufacture.

One type of sensor system intended to solve this continuing need is taught in U.S. Pat. No. 5,272,476, "Data Acquisition System Having Novel, Low Power Circuit For Time-division Multiplexing Sensor Array Signals." The '476 patent describes multiple transceivers linked to a control circuit by a two-wire signal transmission line. The system employs time division multiplexing to enable each of the transceivers in a non-varying sequence and at a sequence rate which is cyclically repeated. This type of system performs well when it is desirable to obtain data from each of the transceivers at the sequence rate and cycle periodicity, as for example, in applications where all of the sensors are of the same type. For example, in an acoustic array, it may be desirable to repeatedly sample the data from acoustic sensors, one at a time, and to re-sample such sensors at periodic intervals. However, for sensor arrays which include different types of sensors, such as compass direction sensors, acoustic sensors, salinity sensors, and/or current flow sensors, it may be preferable to sample the sensors at different rates. For example, ocean conductivity typically changes at a rate many orders of magnitude less than the rate at which the acoustic properties of the environment may changes. For a sensor array comprised of conductivity and acoustic sensors, it would be wasteful of the generally limited electrical power capacity and the limited data transmission rate of the data transmission line of the system to repeatedly sample them at the same rate over and over. Another disadvantage of the '476 system is that it requires that the TDM transceivers be linked to the control circuit "C" with at least four wires, or three wires with a sea water ground.

Therefore, a continuing need also exists for a sensor array system comprised of multiple sensors in which each of the sensors may be sampled any number of times, and in either a random or non-random order, depending upon the requirements of a particular application. A further need exists for a system in which the sensors are linked to a central processor by less than three wires to reduce system costs, bulk, and hydrodynamic drag.

SUMMARY OF THE INVENTION

A buoyed sensor array communications system comprises multiple sensor systems electrically connected to a signal transmission line which are positioned at predetermined locations along the signal transmission line to form a distributed sensor array in space. A "distributed" sensor array refers to a sensor array having sensors which may be equally spaced or non-uniformly spaced. Each of the sensor systems generates a data signal in response to receiving an address signal.

The sensor array communications system comprises multiple sensor systems electrically connected to a signal transmission line which are positioned at predetermined locations along the signal transmission line to form a linear sensor array. Each of the sensor systems generates a data signal in response to receiving an address signal. The system further includes; a processor system electrically connected to the signal transmission line for transmitting address signals to enable any one of the sensor systems at a time in a random order and has a data storage memory for storing the data signal from each of the sensor systems as stored data. A radio frequency transmitting system is coupled to the data processor and transmits the stored data at a predetermined time. A negatively buoyant structure connected to the signal transmission line pulls the communications system to the bottom of a body of water upon deployment. A positively buoyant structure supports the processor system and radio frequency transmitting system, and is connected to the signal transmission line. A signal transmission line cutting system mounted in the buoyant structure severs the signal transmission line upon receipt of a cutting system enablement signal generated by the processor system, whereupon the buoyant structure floats to the surface of the water. Then the transmitting system transmits the stored data as an RF signal.

These and other advantages of the present invention will become more readily apparent upon review of the following specification taken in conjunction with accompanying figures and claims.

DESCRIPTION OF THE DRAWINGS

Throughout the several views, like elements are referenced using like reference designations.

DESCRIPTION OF THE PREFERRED EMBODIMENT

Figure 1:
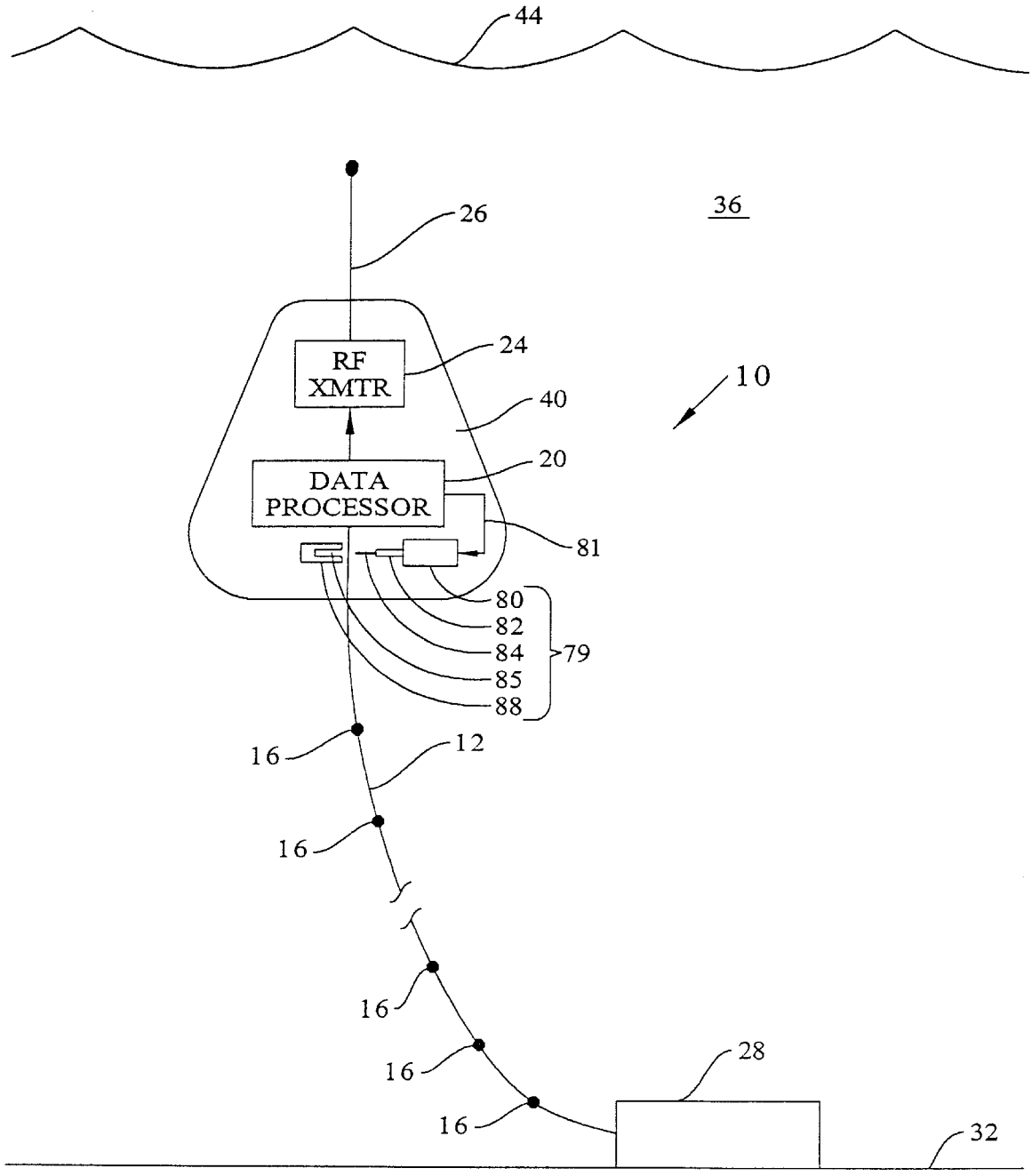
FIG. 1 shows a buoyed sensor array communications system embodying various features of the present invention which is suspended in a vertical array.
Figure 2:
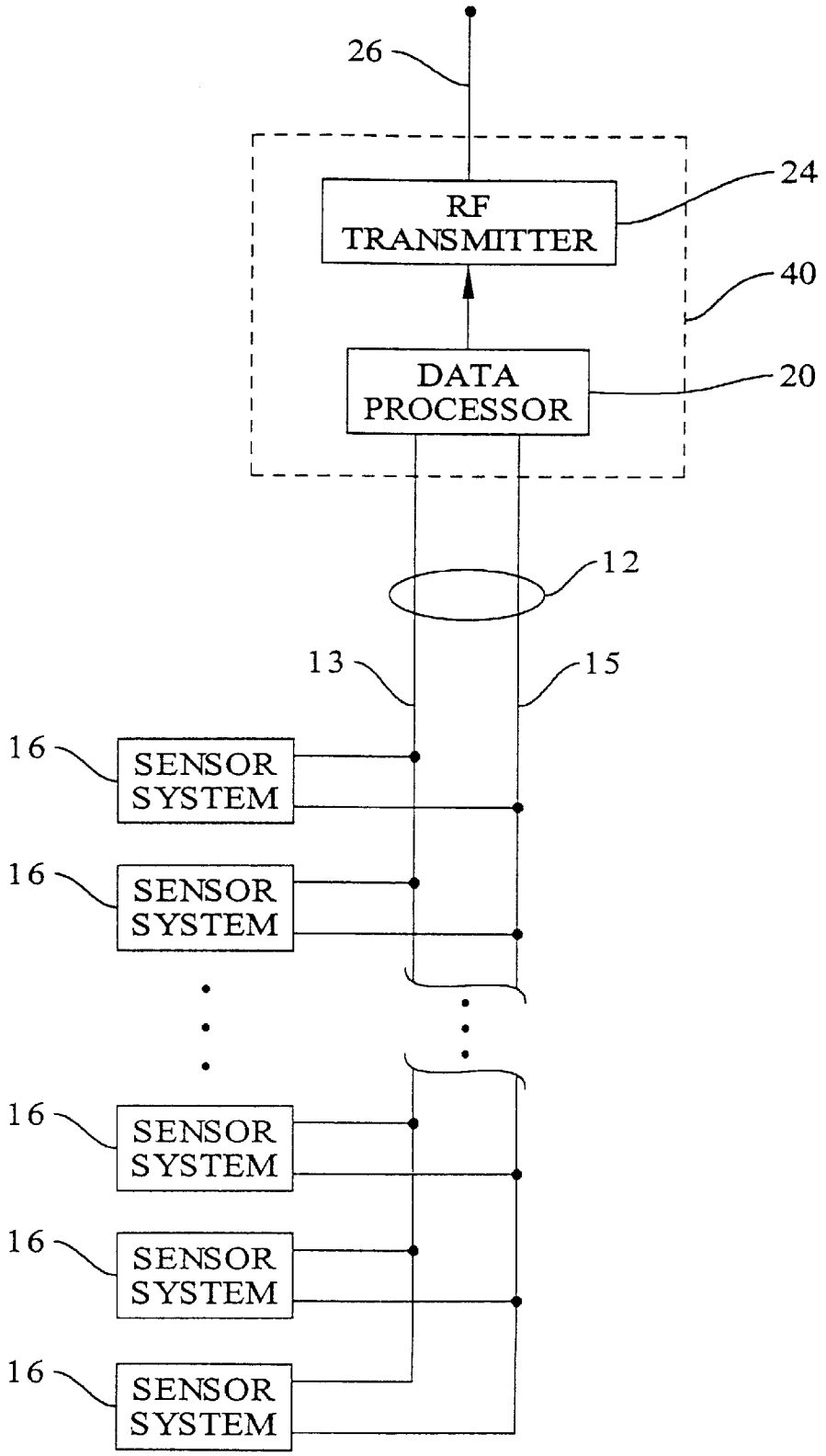
FIG. 2 shows a typical sensor system connected to the data processor via a two-wire signal transmission line.

Referring to FIG. 1, there is illustrated an example of a buoyed sensor array communications system 10 embodying various features of the present invention which is shown to include a signal transmission line 12, multiple sensors 16 electrically connected and positioned along the signal transmission line 12 to form a generally linear sensor array. When enabled, each of the sensors 16 generates a data signal in response to detecting a physical characteristic of the environment. A very important advantage of the communications system 10 is that the processor system 20 transmits address signals, one at a time, via signal line 12 to enable any one of the sensor systems 16 at a time in a selectively accessed order. The signal line 12 may be implemented as a two-wire system comprising signal lines 13 and 15, as shown in FIG. 2, or as a one-wire system that employs a sea-water ground. The enabled sensor 16 then transforms environmental characteristics in the body of water 36 into a data signal 68 (FIG. 3) that is provided to the data processor 20 via the signal line 12 and stored in a memory device, not shown. The other sensors 16 may also be enabled one at a time in a selectively accessed order so that the entire array of sensors 16 are not necessarily enabled in the same order or at some fixed frequency. The phrase "selectively accessed order" means that any one of the sensor systems 16 may be enabled in any particular order, including a serial or non-serial order, and at a periodic or non-periodic rate.

The processor 20 may be implemented as an Onset Computer Model 8 micro controller which includes a 256 kilobytes of flash memory and a real time clock. The memory of processor 20 stores data encoded in the data signals 68 (FIG. 3) as stored data. A radio frequency transmitting system 24, which may be implemented for example, as an RF modem or cellular telephone, transmits the stored data at a selected time or upon satisfaction of some predetermined condition via RF signal 90. An example of one such predetermined condition results when the positively buoyant structure 40 floats on the surface 44 of the water body 36. A negatively buoyant structure 28 is tethered to the signal transmission line 12 in accordance with well known techniques so that after deployment, the negatively buoyant structure 28 pulls the communications system 10 to the bottom 32 of a body of water 36 such as the ocean or a lake. The negatively buoyant structure 28 may be implemented as a metal weight. However, materials other than metal may also be used, so long as the structure 28 has negative buoyancy. When the negatively buoyant structure 28 is implemented as a tube, the signal line and attached sensor systems 16 may be coiled and stored in the tube. However, while the communication system 10 is being deployed, the positively buoyant structure 40 pulls on the signal transmission line 12, causing the signal transmission line to pay out from the tube-shaped negatively buoyant structure 28.

Figure 4:
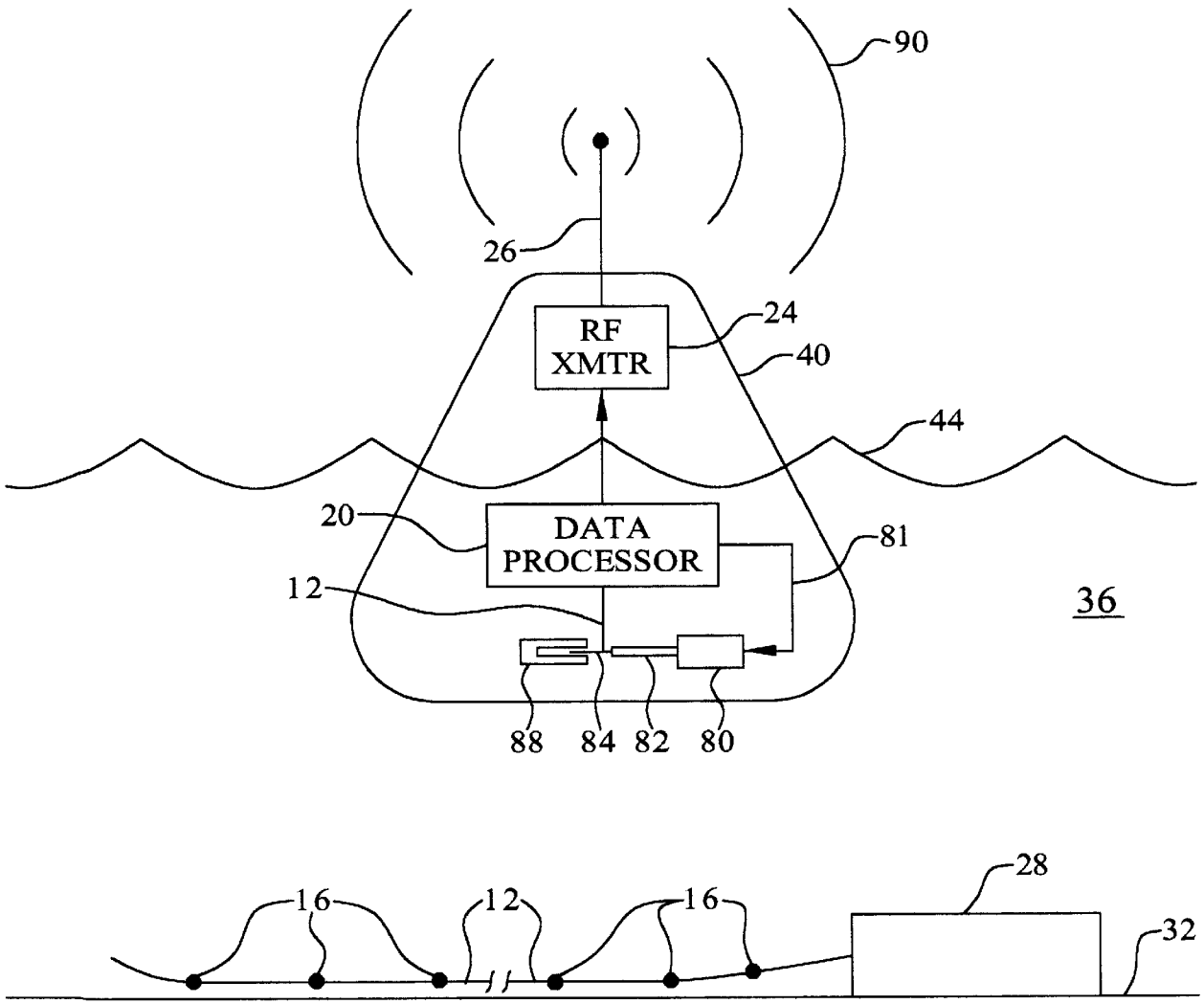
FIG. 4 shows the buoyed sensor array communications system of FIG. 1 after the buoyed structure has been released from the signal transmission line.

The processor 20 and radio frequency transmitter 24 are mounted in a positively buoyant structure 40. In FIG. 1 the buoyant structure is shown as having a generally frustrum shaped configuration. However, the structure 40 may also be implemented using other shapes. For example, the structure 40 may be tubular shaped and made from ABS or polyethylene tubing, or from any other material that is chemically resistant to sea water. The signal transmission line 12 is connected, or tethered to the processor 20 so that the buoyant force provided by the structure 40 pulls upwardly on the signal transmission line 12, thereby assuring that the sensors 16 are positioned in an essentially vertical sensor array. At some predetermined time, or upon satisfaction of some predetermined condition, data processor 20 provides an output signal 81 to enable signal transmission line cutting system 79 whereupon signal transmission line 12 is severed. After signal transmission line 12 is severed, the structure 40 ascends to the surface 44 of the body of water 36, as shown in FIG. 4. After rising to the surface 44, the radio frequency transmitter 24 transmits the data stored in the data processor 20 as RF signal 90 to a remote RF receiving station via antenna 26, such as found on an orbiting satellite. A principal advantage of the communications system 10 is that it provides maximum flexibility in the acquisition of data by a vertical sensor array. Another advantage of the present invention is that the buoyant structure 40 will rise to the surface 44 of the body of water 36, regardless of local currents.

The invention provides a structure that is much easier to design, build, and implement compared to a system having a floating buoy tethered directly to the bottom of the body of water. For example, a buoy floating on the ocean surface and which is tethered to the bottom of the sea is vulnerable to being pulled under water by a combination of water currents and wave action. However, the present invention is not affected by such conditions.

Figure 5:
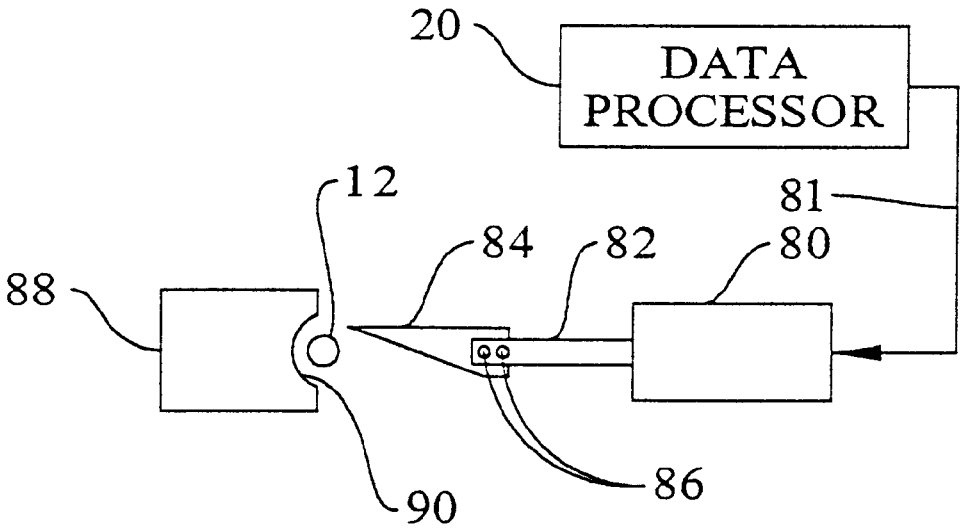
FIG. 5 shows the signal line cutting system.

Referring to FIGS. 1 and 5 collectively, the signal line cutting system 79 mounted in structure 40 includes an electrically actuated linear solenoid 80 with an actuation rod 82, a cutting blade 84, and a blade receptacle 88 which receives the blade in slot 85. The blade 84 may be mounted to the rod 82 using threaded fasteners 86. The blade receptacle 88 includes a semicircular recess 90 through which a discrete length the signal transmission line 12 is positioned. When data processor 20 generates cutting system enablement signal 81, the actuation rod 82 is displaced, thereby forcing the blade 84 to sever the signal transmission line 12 as the blade 84 feeds into groove 85 of blade receptacle 88.

Figure 3:
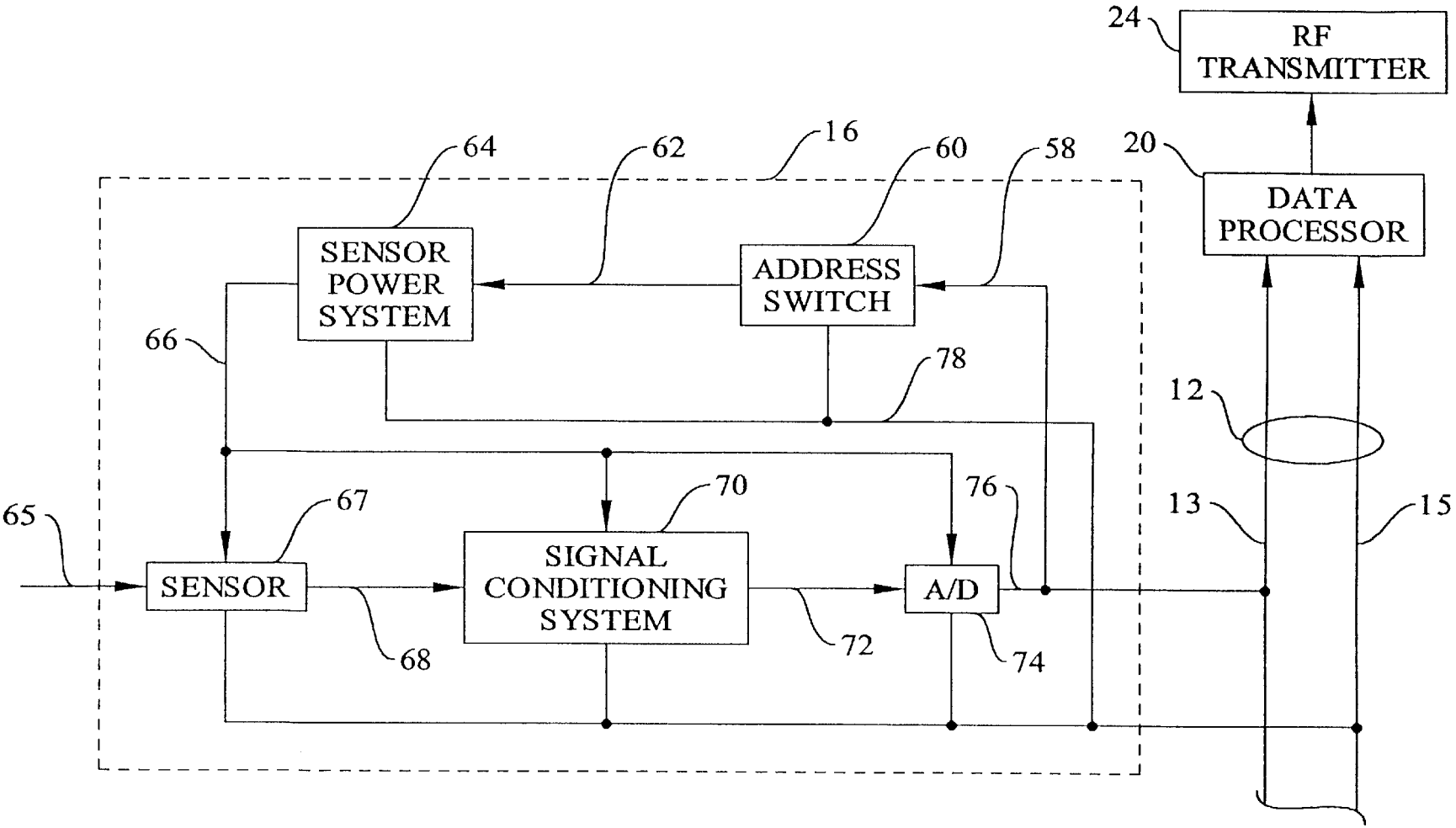
FIG. 3 is an expanded block diagram of the sensor system of FIG. 1.

Referring to FIG. 3, sensor system 16 includes an address switch 60, sensor power system 64, sensor 67, signal conditioning system 70, and an analog-to-digital (A/D) converter 74. Each sensor system 16 is assigned a unique address. The address switch provides an output signal 62 that enables sensor power system 64 only upon receipt of a unique address signal for that particular sensor system 16 via signal line 13 provided by the data processor 20 and signal line 58. Signal line 58 electrically connects signal line 13 to the address switch 60. A suitable address switch may be implemented as a Dallas Semiconductor Model D82407 Dual Addressable Switch which includes a 1k-bit memory. Sensor power system 64 is a conventional battery powered relay which when enabled, provides a battery power signal 66 that energizes the sensor 67, signal conditioning system 70, and A/D converter 74. Sensor 67 detects and transduces an input signal 65, representing a physical characteristic of the environment, into an analog electrical signal 68. Signal conditioning system 70 conventionally provides low-pass and/or high-pass filtering of signal 68 to thereby generate a filtered analog electrical signal 72. A/D converter 74 transforms the analog signal into a digital signal 76 that is provided to the data processor 20 via signal line 13. Address switch 60, sensor power system 64, sensor 67, signal conditioning system 70, and A/D converter 74 are grounded to data processor 20 by electrical conductor 78 which is connected to signal line 15. Sensors 67 may be implemented using any combination of sensors, as for example, pressure, conductivity, temperature, acoustic, compass, accelerometer, flow meter, tilt, and/or any other sensor suitable for detecting an environmental characteristic of interest. The flow meter sensor may be of the type described in commonly assigned U.S. Pat. Nos. 4,308,753 and 4,000,648, each incorporated herein by reference.

Signal lines 13 and 15 each may be implemented as Berk-Tek, Inc. Model BTS-29-13P AWG29 wire. Such wire is polyethylene coated and has a tensile strength of about 40 lbs. The polyethylene coating provides good electrical insulation and is chemically resistant to sea water. AWG29 wire has a very small diameter, thereby providing the system with very low drag due to water currents flowing past the system 10.

Obviously, many modifications and variations of the present invention are possible in the light of the above teachings. It is therefore to be understood that within the scope of the appended claims, the invention may be practiced otherwise than as specifically described. For example, while the implementation of certain elements has been described with reference to components identified using specific manufacturer model numbers, it is to be understood that such elements may be otherwise implemented using elements meeting the stated functional requirements. Further, signal line 12 may be implemented as a one-wire system that employs a sea-water ground.

We claim:

1. A buoyed sensor array communications system, comprising:

a signal transmission line;

multiple sensor systems electrically connected to said signal transmission line, wherein one of said sensor systems at a time generates a data signal in response to receiving an address signal;

a processor system electrically connected in parallel to said sensor systems for transmitting an address signal to enable any one of said sensor systems in a selectively accessed order, and for storing data encoded in each said data signal;

a radio frequency transmitting system for transmitting said stored data;

a negatively buoyant structure connected to said signal transmission line which sinks to the bottom of a body of water after being deployed;

a positively buoyant structure for supporting said processor system and said radio frequency transmitting system; and a signal transmission line cutting system mounted in said positively buoyant structure for severing said signal transmission line upon receipt of a cutting system enablement signal generated by said processor system, whereupon said positively buoyant structure floats to the surface of said body of water.

2. The buoyed sensor array communications system of claim 1 wherein each of said sensor systems includes:

an addressable switch having a unique address which generates a first output signal in response to receiving one of said address signals encoded with said unique address;

a power supply which provides a power signal upon receipt of said first output signal from said addressable switch;

a sensor which generates said data signal in response to receiving said power signal from said power supply;

a signal conditioning filter which filters said data signal; and an analog to digital converter for transforming said filtered data signal into a digital data signal.

3. The buoyed sensor array communications system of claim 1 wherein said signal transmission line is a two-wire system.

4. The buoyed sensor array communications system of claim 1 wherein said negatively buoyant structure contains said signal transmission line and said sensor systems prior to deployment of said sensor array communications system.

5. The buoyed sensor array communications system of claim 1 wherein said radio frequency transmitting system includes a modem.

6. The buoyed sensor array communications system of claim 1 wherein said radio frequency transmitting system includes a cellular telephone.

7. The buoyed sensor array communications system of claim 1 wherein one of said sensor systems includes a pressure sensor.

8. The buoyed sensor array communications system of claim 1 wherein one of said sensor systems includes a fluid velocity sensor.

9. The buoyed sensor array communications system of claim 1 wherein one of said sensor systems includes a conductivity sensor.

10. The buoyed sensor array communications system of claim 1 wherein one of said sensor systems includes a temperature sensor.

11. The buoyed sensor array communications system of claim 1 wherein one of said sensor systems includes a compass sensor.

12. The buoyed sensor array communications system of claim 1 wherein one of said sensor systems includes an accelerometer.

13. The buoyed sensor array communications system of claim 1 wherein one of said sensor systems includes an ocean current sensor.

14. The buoyed sensor array communications system of claim 1 wherein one of said sensor systems includes a tilt sensor.

*15. A buoyed sensor array communications system, comprising:*

*a signal transmission line;*

*multiple sensor systems electrically connected to said signal transmission line, wherein one of said sensor systems at a time generates a data signal in response to receiving an address signal, and each of said sensor systems includes:*

*an addressable switch having a unique address which generates a first output signal in response to receiving an address signal encoded with said unique address;*

*a battery energized power supply which provides a power signal upon receipt of said first output signal from said addressable switch; and*

*a sensor which generates said data signal in response to receiving said power signal from said power supply;*

*a processor system electrically connected in parallel to said sensor system for transmitting an address signal to enable any one of said sensor systems in a selectively accessed order, and for storing data encoded in said data signal; and*

*a radio frequency transmitting system for transmitting said stored data.*

*16. The sensor array communications system of claim 15 wherein said signal transmission line is a two-wire system.*

*17. The sensor array communications system of claim 15 further including a negatively buoyant structure attached to said signal transmission line and which contains said signal transmission line and said sensor systems prior to deployment of said sensor array communications system.*

*18. The sensor array communications system of claim 15 wherein said radio frequency transmitting system includes a modem.*

*19. The sensor array communications system of claim 15 wherein said radio frequency transmitting system includes a cellular telephone.*

*20. The sensor array communications system of claim 15 wherein one of said sensor systems includes a pressure sensor.*

*21. The sensor array communications system of claim 15 wherein one of said sensor systems includes a fluid velocity sensor.*

*22. The sensor array communications system of claim 15 wherein one of said sensor systems includes a conductivity sensor.*

*23. The sensor array communications system of claim 15 wherein one of said sensor systems includes a temperature sensor.*

*24. The sensor array communications system of claim 15 wherein one of said sensor systems includes a compass sensor.*

*25. The sensor array communications system of claim 15 wherein one of said sensor systems includes an accelerometer.*

*26. The sensor array communications system of claim 15 wherein one of said sensor systems includes an ocean current sensor.*

*27. The sensor array communications system of claim 15 wherein one of said sensor systems includes a tilt sensor.*

*28. The sensor array communications system of claim 15 wherein one of said sensor systems includes a positively buoyant structure for supporting said processor system and said radio frequency transmitting system.*

*29. A buoyed sensor array communications system, comprising:*

*a signal transmission line;*

*multiple sensor systems electrically connected to said signal transmission line, wherein one of said sensor systems at a time generates a data signal in response to receiving an address signal;*

*a processor system electrically connected in parallel to said sensor systems for transmitting an address signal to enable any one of said sensor systems in a selectively accessed order, and for storing data encoded in each said data signal;*

*a radio frequency transmitting system for transmitting said stored data;*

*a negatively buoyant structure connected to said signal transmission line;*

*a positively buoyant structure for supporting said processor system and said radio frequency transmitting system; and*

*a signal transmission line cutting system mounted in said positively buoyant structure for severing said signal transmission line upon receipt of a cutting system enablement signal generated by said processor system.*

*30. The buoyed sensor array communications system of claim 29 wherein each of said sensor systems includes:*

*an addressable switch having a unique address which generates a first output signal in response to receiving one of said address signals encoded with said unique address;*

*a power supply which provides a power signal upon receipt of said first output signal from said addressable switch;*

*a sensor which generates said data signal response to receiving said power signal from said power supply;*

*a signal conditioning filter which filters said data signal; and*

*an analog to digital converter for transforming said filtered data signal into a digital data signal.*

*31. The buoyed sensor array communications system of claim 29 wherein said signal transmission line is a two-wire system.*

*32. The buoyed sensor array communications system of claim 29 wherein said negatively buoyant structure contains said signal transmission line and said sensor systems prior to deployment of said sensor array communications system.*

* * * * *

UNITED STATES PATENT AND TRADEMARK OFFICE
Certificate

Patent No. RE 36,643

Patented: April 4, 2000

On petition requesting issuance of a certificate for correction of inventorship pursuant to 35 U.S.C. 256, it has been found that the above identified patent, through error and without deceptive intent, improperly sets forth the inventorship.

Accordingly, it is hereby certified that the correct inventorship of this patent is: Jack R. Olson; J. Mark Stevenson; Barbara J. Sotirin; Vincent K. McDonald.

Signed and Sealed this Twelth Day of June, 2001.

THOMAS H. TARCZA
*Supervisory Patent Examiner*
Art Unit 3662